United States Patent
Fu (10) Patent No.: US 12,537,628 B2
(45) Date of Patent: Jan. 27, 2026

(54) METHOD AND APPARATUS FOR DETERMINING HARQ FEEDBACK DELAY, AND STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 377 days.

(21) Appl. No.: 18/003,792

(22) PCT Filed: Jul. 7, 2020

(86) PCT No.: PCT/CN2020/100720
§ 371 (c)(1),
(2) Date: Dec. 29, 2022

(87) PCT Pub. No.: WO2022/006758
PCT Pub. Date: Jan. 13, 2022

(65) Prior Publication Data
US 2023/0254067 A1 Aug. 10, 2023

(51) Int. Cl.
*H04L 1/1812* (2023.01)
*H04W 72/1273* (2023.01)
*H04W 72/23* (2023.01)

(52) U.S. Cl.
CPC ....... *H04L 1/1812* (2013.01); *H04W 72/1273* (2013.01); *H04W 72/23* (2023.01)

(58) Field of Classification Search
CPC .. H04L 1/1812; H04W 72/23; H04W 72/1273
See application file for complete search history.

(56) References Cited

U.S. PATENT DOCUMENTS

2017/0164397 A1\* 6/2017 Zeng .................. H04L 5/0055
2017/0288819 A1\* 10/2017 Chen .................. H04L 1/1887
(Continued)

FOREIGN PATENT DOCUMENTS

CN 108271262 A 7/2018
CN 110535587 A 12/2019
(Continued)

OTHER PUBLICATIONS

Examination report for Indian Application No. 202347002054, issued on May 9, 2023, 5 pages.
(Continued)

*Primary Examiner* — Jael M Ulysse
(74) *Attorney, Agent, or Firm* — Finnegan, Henderson, Farabow, Garrett & Dunner, L.L.P.

(57) ABSTRACT

A method for determining HARQ feedback delay is performed by a base station, and includes: determining a target set of HARQ feedback delays among more than one set of HARQ feedback delays, which are predefined in a protocol
(Continued)

--- determining a target set of HARQ feedback delays among more than one set of HARQ feedback delays, which are predefined in a protocol and correspond to downlink control information (DCI) of a preset format — 101 sending the DCI of the preset format configured to indicate a target delay value, to a terminal — 102 and correspond to downlink control information (DCI) of a preset format; wherein the more than one set of HARQ feedback delays correspond to different subcarrier bandwidths; and sending the DCI of the preset format configured to indicate a target delay value, to a terminal, wherein the target delay value is one of more than one delay value included in the target set of HARQ feedback delays.

12 Claims, 8 Drawing Sheets

(56) References Cited

U.S. PATENT DOCUMENTS

| | | | | |
|---|---|---|---|---|
| 2019/0036654 A1* | 1/2019 | Kim | ............... | H04L 1/1812 |
| 2019/0268803 A1* | 8/2019 | He | ............... | H04W 28/04 |
| 2019/0349942 A1* | 11/2019 | Li | ............... | H04L 1/1861 |
| 2020/0128578 A1* | 4/2020 | Park | ............... | H04L 1/1812 |
| 2021/0234643 A1* | 7/2021 | Wang | ............... | H04L 1/1887 |
| 2021/0314095 A1* | 10/2021 | Gao | ............... | H04L 1/1614 |
| 2022/0231820 A1* | 7/2022 | Zaki | ............... | H04L 5/0055 |
| 2023/0106098 A1* | 4/2023 | Wang | ............... | H04L 1/1854 |
| | | | | 370/329 |
| 2023/0224913 A1* | 7/2023 | Huang | ............... | H04L 1/1864 |
| 2023/0275705 A1* | 8/2023 | Muruganathan | ...... | H04L 1/1864 |
| | | | | 370/329 |
| 2024/0049245 A1* | 2/2024 | Kim | ............... | H04W 72/23 |

FOREIGN PATENT DOCUMENTS

| | | |
|---|---|---|
| EP | 3618494 A1 | 3/2020 |
| WO | WO 2018228570 A1 | 12/2018 |
| WO | WO 2022065797 A1 | 3/2022 |

OTHER PUBLICATIONS

International Search Report and Written Opinion of International Application No. PCT/CN2020/100720, mailed Apr. 1, 2021, 13 pages.
Qualcomm Incorporated; Enhancements to Scheduling and HARQ operation for NR-U; 3GPP TSG-RAN WG1 Meeting #97, R1-1907263, Reno, US, May 13-May 17, 2019, 12 pages.
Office Action for Russian Application No. 2023100623/07, issued on Aug. 30, 2023.
Notice of Reasons for Refusal for Japanese Application No. 2022-581014, issued on Oct. 20, 2023.
Search Report for EP Application No. 20944669.9, dated Mar. 6, 2024, 9 pages.
Office Action dated Feb. 7, 2024, in Japanese Patent Application No. 2022-581014, 8 pages.
LG Electronics, "Considerations On HARQ Process and Feedback For NR", R1-1715886, 3GPP TSG-RAN WG1 Meeting NR#3, Nagoya, Japan, Sep. 18-21, 2017, 14 pages.
Korean Office Action for KR Application No. 10-2023-7001841 dated Nov. 10, 2025.
Ericsson, "HARQ configurations in NR", Tdoc R2-1704410, 3GPP TSG-RAN WG2 #98, Hangzhou, P.R. of China, May 15-19, 2017.

* cited by examiner

METHOD AND APPARATUS FOR DETERMINING HARQ FEEDBACK DELAY, AND STORAGE MEDIUM

CROSS-REFERENCE TO RELATED APPLICATION

This application is the US national phase application of International Application No. PCT/CN2020/100720, filed on Jul. 7, 2020, the entire contents of which are incorporated herein by reference.

TECHNICAL FIELD

The present disclosure relates to the field of communication, and in particular to a method and an apparatus for determining HARQ feedback delay and a storage medium.

BACKGROUND

In the 5G (5th generation mobile networks, 5th generation mobile communication technology) NR (New Radio, new air interface) protocol, a base station schedules downlink data through DCI (Downlink Control Information), enables the downlink data to be transmitted on the PDSCH (Physical Downlink Shared Channel, Physical Downlink Shared Channel) in a time unit n, and instructs, in the DCI, a terminal to feedback an HARQ (Hybrid Automatic Repeat reQuest) result for the downlink data transmitted in the time unit n, on the PUCCH (Physical Uplink Control Channel) in the time unit (n+k1).

Here, the value of k1 represents the feedback delay of the HARQ result, that is, the HARQ result corresponding to the terminal receiving the PDSCH in the time unit n and sending the PDSCH on the PUCCH in the time unit (n+k1), which requires the terminal to be able to complete demodulation of the PDSCH and generation of HARQ result information in the number k1 of time units.

The currently formulated NR protocol is generally applicable to communication systems of low frequency bands below 52.6 GHz.

SUMMARY

According to a first aspect of the present disclosure, a method for determining HARQ feedback delay is provided. The method is performed by a base station and includes:

determining a target set of HARQ feedback delays among more than one set of HARQ feedback delays, which are predefined in a protocol and correspond to downlink control information (DCI) of a preset format; wherein the more than one set of HARQ feedback delays correspond to different subcarrier bandwidths;

sending the DCI of the preset format configured to indicate a target delay value, to a terminal; wherein the target delay value is one of more than one delay value included in the target set of HARQ feedback delays.

According to a second aspect of the present disclosure, a method for determining HARQ feedback delay is provided. The method is performed by a terminal and includes:

receiving downlink control information (DCI) of a preset format sent by a base station;

determining a target delay value for performing HARQ feedback according to the DCI of the preset format.

According to a third aspect of the present disclosure, an apparatus for determining HARQ feedback delay is provided. The apparatus is applied to a base station and includes:

a processor;
a memory for storing processor-executable instructions;
wherein the processor is configured to:

determine a target set of HARQ feedback delays among more than one set of HARQ feedback delays, which are predefined in a protocol and correspond to downlink control information (DCI) of a preset format; wherein the more than one set of HARQ feedback delays correspond to different subcarrier bandwidths;

send the DCI of the preset format configured to indicate a target delay value, to a terminal; wherein the target delay value is one of more than one delay value included in the target set of HARQ feedback delays.

According to a fourth aspect of the present disclosure, an apparatus for determining HARQ feedback delay is provided. The apparatus is applied to a terminal and includes:

a processor;
a memory for storing processor-executable instructions;
wherein the processor is configured to:

receive downlink control information DCI of a preset format sent by a base station;

determine a target delay value for performing HARQ feedback according to the DCI of the preset format.

It is to be understood that both the foregoing general description and the following detailed description are exemplary and explanatory only and are not restrictive of the present disclosure.

BRIEF DESCRIPTION OF THE DRAWINGS

The accompanying drawings here, which are incorporated in the specification and constitute a part of the present specification, illustrate embodiments consistent with the present disclosure and together with the description serve to explain the principles of the present disclosure.

DETAILED DESCRIPTION

The embodiments will now be described in detail here, examples of which are illustrated in the accompanying drawings. When the following description relates to the accompanying drawings, the same numerals in different drawings refer to the same or similar elements unless otherwise indicated. The implementations described in the following embodiments do not represent all implementations consistent with the present disclosure. Rather, they are merely examples of apparatuses and methods consistent with aspects of the present disclosure as recited in the appended claims.

The terminologies used in the present disclosure are for the purpose of describing particular embodiments only, and are not intended to limit the present disclosure. As used in the present disclosure and the appended claims, the singular forms "a", "said", and "the" are intended to include the plural forms as well, unless the context clearly dictates otherwise. It should also be understood that the term "and/or" as used herein refers to and includes any and all possible combinations of one or more of the associated listed items.

It should be understood that although the terms first, second, third, etc. may be used in the present disclosure to describe various information, these items of information should not be limited to these terms. These terms are only used to distinguish information of the same type from one another. For example, without departing from the scope of the present disclosure, first information may also be referred to as second information, and similarly, second information may also be referred to as first information. Depending on the context, the word "if" as used herein may be interpreted as "upon" or "when" or "in response to determination."

In the embodiments of the present disclosure, the involved DCI is a DCI of a preset format, wherein the preset format is a default format used by a base station for scheduling a PDSCH, for example, a 1-0 format. The DCI in the 1-0 format may be used before an RRC (Radio Resource Control) connection is established between a base station and a terminal. Because the RRC connection has not been established between the base station and the terminal, the base station cannot inform the terminal of the value of the HARQ feedback delay k1 through a RRC parameter, the values of the set of k1 corresponding to the DCI in the 1-0 format generally need to be predefined in the protocol. In a communication system of low frequency band below 52.6 GHz, for the DCI in the 1-0 format, the values of the set of k1 defined in the protocol include $\{1, 2, 3, 4, 5, 6, 7, 8\}$.

In the communication system of low frequency band, optional SCSs (SubCarrierSpacings, subcarrier bandwidths) may be 15 KHz (kilohertz), 30 KHz, 60 KHz, 120 KHz, and the time unit generally adopts slot (time slot). In the case of a subcarrier bandwidth of 15 KHz, the duration of one slot is 1 ms (milliseconds), in the case of a subcarrier bandwidth of 30 KHz, the duration of one slot is 0.5 ms, in the case of a subcarrier bandwidth of 60 KHz, the duration of one slot is 0.25 ms, and so on. It can be seen that the larger the subcarrier bandwidth is, the shorter the duration of one slot will be.

In a communication protocol of high frequency band, the high frequency band in an embodiment of the present disclosure may refer to about 60 GHz (gigahertz). In order to cope with phase noise, a relatively large SCS, such as 960 KHz, will usually be selected. In the case where the SCS is 960 KHz, the duration of one slot is 0.015625 ms, which is $\frac{1}{64}$ ms.

It can be seen that in the communication system of high frequency band, in the case where the SCS adopts 960 KHz, the duration of one slot is far less than 1 ms. In the case where the DCI adopts the 1-0 format, k1 specified in the current standard is a value selected from the set of $\{1, 2, 3, 4, 5, 6, 7, 8\}$. That is, the maximum value of k1 is 8, that is, 0.125 ms. In the case where the duration of one slot is far less than 1 ms, it is difficult for the terminal to complete demodulation of the PDSCH and generation of the HARQ results.

The present disclosure provides a solution for determining the HARQ feedback delay for the case where the duration of one slot is far less than 1 ms in a communication system of high frequency band.

The method for determining the HARQ feedback delay provided by the present disclosure will be introduced first from the base station side below.

Figure 1:
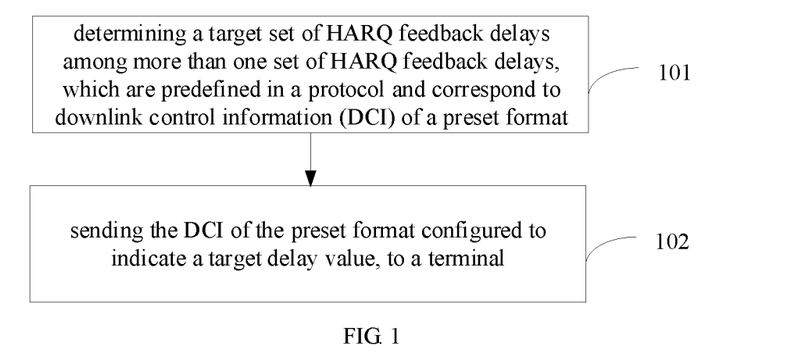
FIG. 1 is a schematic flowchart of a method for determining HARQ feedback delay shown according to an embodiment.

An embodiment of the present disclosure provides a method for determining the HARQ feedback delay, which is applied to a base station. Referring to FIG. 1, which is a flow chart of a method for determining HARQ feedback delay shown according to an embodiment, the method may include the following steps:

In step 101, a target set of HARQ feedback delays may be determined among more than one set of HARQ feedback delays, which are predefined in a protocol and correspond to downlink control information DCI of a preset format.

In the embodiment of the present disclosure, the preset format refers to the 1-0 format, and more than one set of HARQ feedback delays corresponding to the DCI in the 1-0 format may be predefined in the protocol. And the more than one set of HARQ feedback delays correspond to different Subcarrier bandwidths. For example, the SCS of 240 KHz corresponds to the set 1 of HARQ feedback delays, the SCS of 480 KHz corresponds to the set 2 of HARQ feedback delays, and the SCS of 960 KHz corresponds to the set 3 of HARQ feedback delays . . . .

The base station may select one from the above described more than one set of HARQ feedback delays as the target set of HARQ feedback delays.

In step 102, the DCI of the preset format configured to indicate a target delay value may be sent to a terminal.

In the embodiment of the present disclosure, the target set of HARQ feedback delays includes more than one delay value, and the base station may select, according to service requirements of the current terminal, one as the target delay value for the terminal. Further, the base station may send the DCI of the preset format configured to indicate the target delay value to the terminal. Subsequently, the target delay value may be determined at the terminal side according to the DCI of the preset format.

In the above described embodiment, a base station may select one from more than one set of HARQ feedback delays, which are predefined in a protocol and correspond to the DCI of a preset format, as a target set of HARQ feedback delays. The more than one set of HARQ feedback delays correspond to different subcarrier bandwidths. Further, the base station sends the DCI of the preset format configured to indicate a target delay value to a terminal, so that the terminal can determine the target delay value. The target delay value is one of more than one delay value included in the target set of HARQ feedback delays. The present disclosure achieves the purpose of determining the HARQ feedback delay, for the case where one time unit is far smaller than 1 ms, in a communication system of high frequency band.

In an optional embodiment, the more than one set of HARQ feedback delays, which are predefined in the protocol, correspond to different subcarrier bandwidths.

Since the larger the SCS is, the shorter the duration of one slot is, in order to ensure that the terminal can complete the demodulation of the PDSCH and the generation of the HARQ feedback result within the time unit corresponding to the delay value, in the more than one set of HARQ feedback delays, the larger the subcarrier bandwidth is, the larger the maximum delay value in the corresponding set of HARQ feedback delays can be.

For example, for the subcarrier bandwidth of 240 KHz, which corresponds to the set 1 of HARQ feedback delays, the maximum delay value is m1, for the subcarrier bandwidth of 480 KHz, which corresponds to the set 2 of HARQ feedback delays, the maximum delay value is m2, for the subcarrier bandwidth of 960 KHz, which corresponds to the set 3 of HARQ feedback delays, the maximum delay value is m3, . . . where m1<m2<m3< . . . .

Specifically, the values of the sets of HARQ feedback delays may be shown as follows, for example:

For example, in the case of an SCS of 120 KHz and below, the values of the sets of HARQ feedback delays include {1, 2, 3, 4, 5, 6, 7, 8}, in the case of an SCS of 240 KHz and above, the values of the sets of HARQ feedback delays include {4, 6, 8, 10, 12, 14, 16}.

For another example, in the case of an SCS of 240 KHz and below, the values of the sets of HARQ feedback delays include {1, 2, 3, 4, 5, 6, 7, 8}, in the case of an SCS of 480 KHz and below, the values of the sets of HARQ feedback delays include {5, 6, 7, 8, 9, 10, 11, 12}, in the case of an SCS of 960 KHz and below, the values of the sets of HARQ feedback delays include {4, 8, 12, 16, 20, 24, 28, 32}.

The above is only for illustration, and the sets of HARQ feedback delay actually defined in the standard are not limited to combinations of the above values.

The base station may, according to the currently used subcarrier bandwidth, determine the set of HARQ feedback delays corresponding to the currently used subcarrier bandwidth as the target set of HARQ feedback delays. For example, if the currently used subcarrier bandwidth is 480 KHz, the corresponding set 2 of HARQ feedback delays may be used as the target set of HARQ feedback delays.

In the above described embodiment, the set of HARQ feedback delays corresponding to the currently used subcarrier bandwidth may be determined as the target set of HARQ feedback delays. Optionally, in the more than one set of HARQ feedback delays predefined in the protocol, the larger the subcarrier bandwidth is, the greater the maximum delay value in the corresponding set of HARQ feedback delays is. The present disclosure can ensure that the terminal can complete demodulation of the PDSCH and generation of the HARQ feedback result within the time unit corresponding to the target delay value in the communication system of high frequency band, which achieves the purpose of determining the HARQ feedback delay in a communication system of high frequency band.

Figure 2:
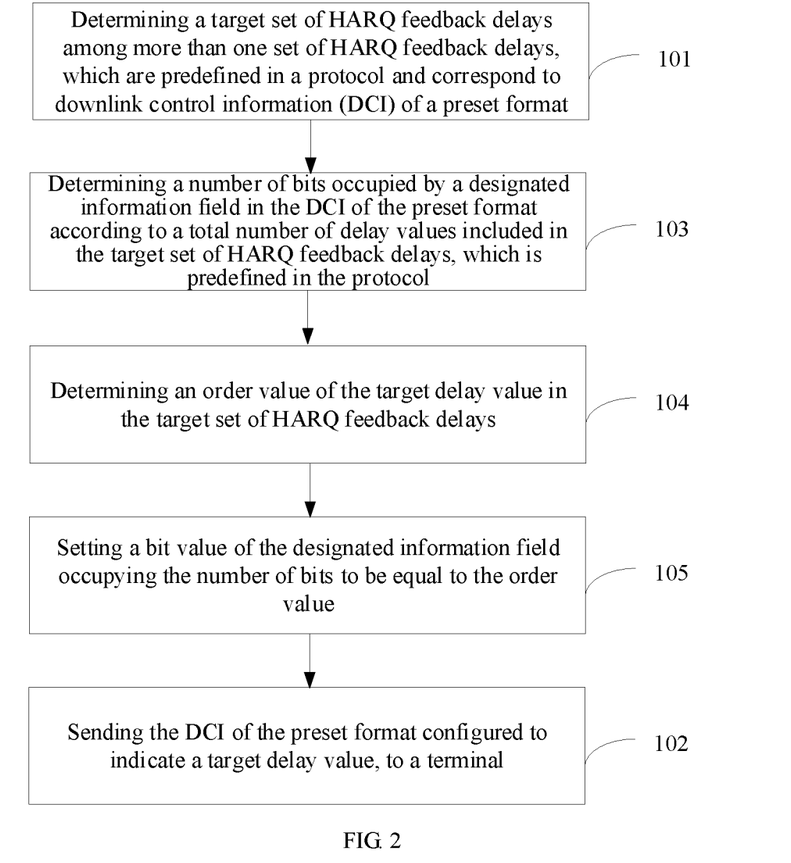
FIG. 2 is a schematic flowchart of another method for determining HARQ feedback delay shown according to an embodiment.

In an embodiment, referring to FIG. 2, which is a flow chart of another method for determining HARQ feedback delay shown according to the embodiment shown in FIG. 1, after the step 102, the method may further include:

In step 103, the number of bits occupied by a designated information field in the DCI of the preset format may be determined according to the total number of delay values included in the target set of HARQ feedback delays, which is predefined in the protocol.

Here, the designated information field is an information field in the DCI, which is configured to indicate the target delay value. The number of bits occupied by the designated information field may be determined according to the total number of delay values included in the target set of HARQ feedback delays, which is predefined in the protocol.

In an embodiment of the present disclosure, assuming the total number of the delay values included in the target set of HARQ feedback delays is N, then the number of bits occupied by the designated information field is $\lceil \log_2 N \rceil$, $\lceil \ \rceil$ represents the calculation of rounding up. The values of N may be 8, 16, and so on, which are pre-agreed in the protocol, and the present disclosure does not limit this. For example, when the value of N is 8, the number of bits occupied by the designated information field is 3.

In step 104, an order value of the target delay value in the target set of HARQ feedback delays may be determined.

In an embodiment of the present disclosure, the order value of the target delay value in the target set of HARQ feedback delays may be determined first. The order value may start from 0 and increment sequentially. For example, the values of the target set of HARQ feedback delays include {5, 6, 7, 8, 9, 10, 11, 12}, and the target delay value is 8, and then the corresponding order value is 3.

In step 105, the bit value of the designated information field occupying the number of bits may be set to be equal to the order value.

For example, the designated information field occupies 3 bits. The target delay value is 8, and the corresponding order value is 3, which is represented by the bit value of the designated information field occupying 3 bits, and then the bit value can be 011.

Correspondingly, the step 103 may include: sending the DCI of the preset format to the terminal, wherein the designated information field in the DCI occupies 3 bits, and the bit value is 011.

In the above described embodiment, the number of bits occupied by the designated information field in the DCI of the preset format may be determined according to the total number of delay values included in the target set of HARQ feedback delay, which is predefined in the protocol. The designated information field is an information field in the DCI, which is configured to indicate the target delay value. Further, according to the target delay value, the bit value of the designated information field occupying the number of bits may be determined. Therefore, the purpose of sending the target delay value to the terminal through the designated information field of the DCI of the preset format in the communication system of high frequency band is achieved.

In the following, from the terminal side, the method for determining HARQ feedback delay provided by the present disclosure will be introduced.

Figure 3:
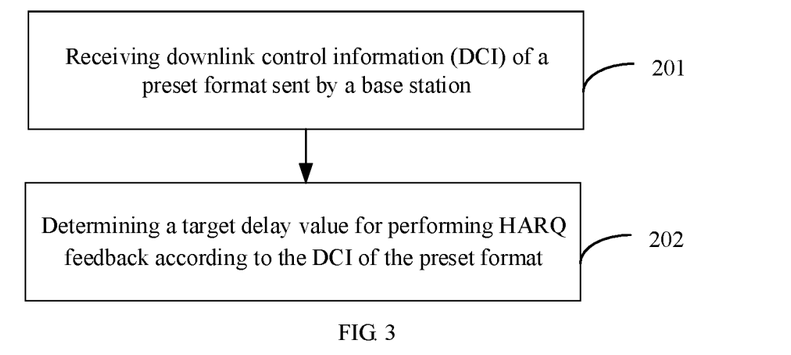
FIG. 3 is a schematic flowchart of another method for determining HARQ feedback delay shown according to an embodiment.

An embodiment of the present disclosure provides another method for determining HARQ feedback delay, which is applied to a terminal. Referring to FIG. 3, which is a flow chart of another method for determining HARQ feedback delay shown according to an embodiment, the method may include the following steps:

In step 201, downlink control information DCI of a preset format sent by a base station may be received.

In an embodiment of the present disclosure, the preset format is a default format used by the base station for scheduling the PDSCH, for example, a 1-0 format.

In step 202, a target delay value for performing HARQ feedback may be determined according to the DCI of the preset format.

In an embodiment of the present disclosure, a designated information field for indicating the target delay value is included in the DCI of the preset format, and the target delay value may be determined according to the designated information field at the terminal side.

In the above described embodiment, the terminal may receive downlink control information DCI of a preset format sent by a base station, so that a target delay value for performing HARQ feedback may be determined according to the DCI of the preset format. And the purpose of determining the HARQ feedback delay in a communication system of high frequency band is achieved.

Figure 4:
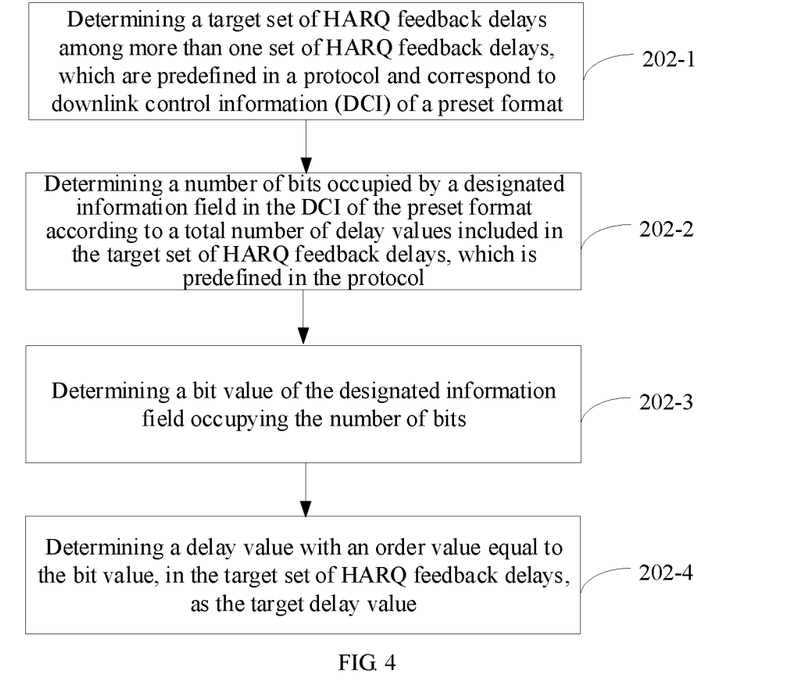
FIG. 4 is a schematic flowchart of another method for determining HARQ feedback delay shown according to an embodiment.

In an optional embodiment, referring to FIG. 4, which is a flowchart of another method for determining HARQ feedback delay shown according to the embodiment shown in FIG. 3, the step 202 may include:

In step 202-1, a target set of HARQ feedback delays may be determined among more than one set of HARQ feedback delays, which are predefined in a protocol and correspond to downlink control information DCI of a preset format.

In an embodiment of the present disclosure, the more than one set of HARQ feedback delays predefined in the protocol correspond to different subcarrier bandwidths. The set of HARQ feedback delays corresponding to the currently used subcarrier bandwidth may be used as the target set of HARQ feedback delays. Similarly, in the more than one set of HARQ feedback delays, the larger the subcarrier bandwidth is, the greater the maximum delay value in the corresponding set of HARQ feedback delays is, which ensures that the PDSCH can be demodulated and the HARQ feedback result can be generated at the terminal side within the time domain unit corresponding to the target delay value.

In step 202-2, the number of bits occupied by a designated information field in the DCI of the preset format may be determined according to the total number of delay values included in the target set of HARQ feedback delays, which is predefined in the protocol.

Here, the designated information field is an information field in the DCI, which is configured to indicate the target delay value. The total number of delay values included in the target set of HARQ feedback delays has been predefined in the protocol.

Assuming the total number is N, then the terminal may determine that the number of bits occupied by the designated information field in the DCI of the preset format is $\lfloor \log_2 N \rfloor$.

In step 202-3, a bit value of the designated information field occupying the number of bits may be determined.

In an embodiment of the present disclosure, the bit value of the designated information field occupying $\lfloor \log_2 N \rfloor$ may be read. For example, N is 8, then the bit value of the designated information field occupying the number 3 of bits may be read.

In step 202-4, in the target set of HARQ feedback delays, a delay value with an order value equal to the bit value may be determined as the target delay value.

In an embodiment of the present disclosure, the order value in the target set of HARQ feedback delays may be sorted starting from 0 and increments sequentially. In the case where the target set of HARQ feedback delays is known, and the order value of the target delay value in the target set of HARQ feedback delays is known, the target delay value may be determined.

Figure 5:
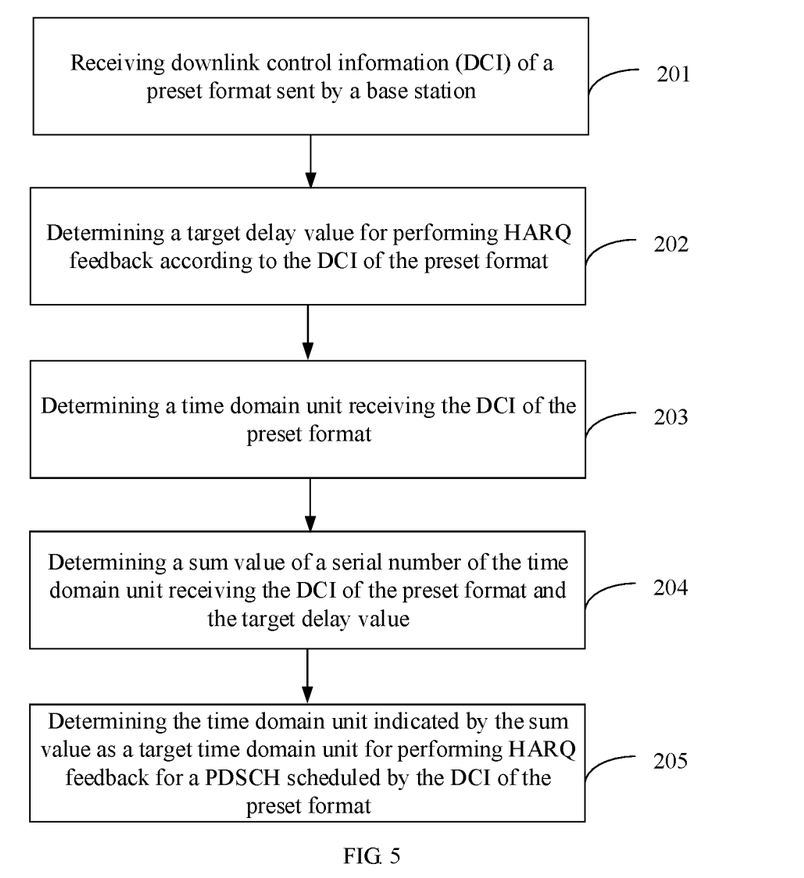
FIG. 5 is a schematic flowchart of another method for determining HARQ feedback delay shown according to an embodiment.

In an optional embodiment, referring to FIG. 5, which is a flow chart of another method for determining HARQ feedback delay shown according to the embodiment shown in FIG. 3, after the step 202, the above described method may further include:

In step 203, a time domain unit receiving the DCI of the preset format may be determined.

In an embodiment of the present disclosure, the time domain unit receiving the DCI of the preset format may be determined. Here, the time domain unit may use, but not limited to a slot, and so on.

In step 204, the sum value of the serial number of the time domain unit receiving the DCI of the preset format and the target delay value may be determined.

In an embodiment of the present disclosure, assuming it is determined that the serial number of the time domain unit receiving the DCI of the preset format is n, and the target delay value is k1, then the sum value is (n+k1).

In step 205, the time domain unit indicated by the sum value may be used as a target time domain unit for performing HARQ feedback for a PDSCH scheduled by the DCI of the preset format.

In an embodiment of the present disclosure, the DCI in the 1-0 format is configured to schedule a certain PDSCH, and the terminal may use the time domain unit indicated by the above sum value as the target time domain unit, and feedback of the HARQ result on the PDSCH scheduled by the DCI may be performed on the target time domain unit. For example, whether the downlink data on the PDSCH is successfully received may be fed back, ACK may be fed back for successful reception, and NACK may be fed back for unsuccessful reception.

In the foregoing embodiment, the terminal may perform feedback of the HARQ result according to the determined target delay value, thereby achieving the purpose of performing feedback of the HARQ result according to the determined target delay value in the communication system of high frequency band.

Figure 6:
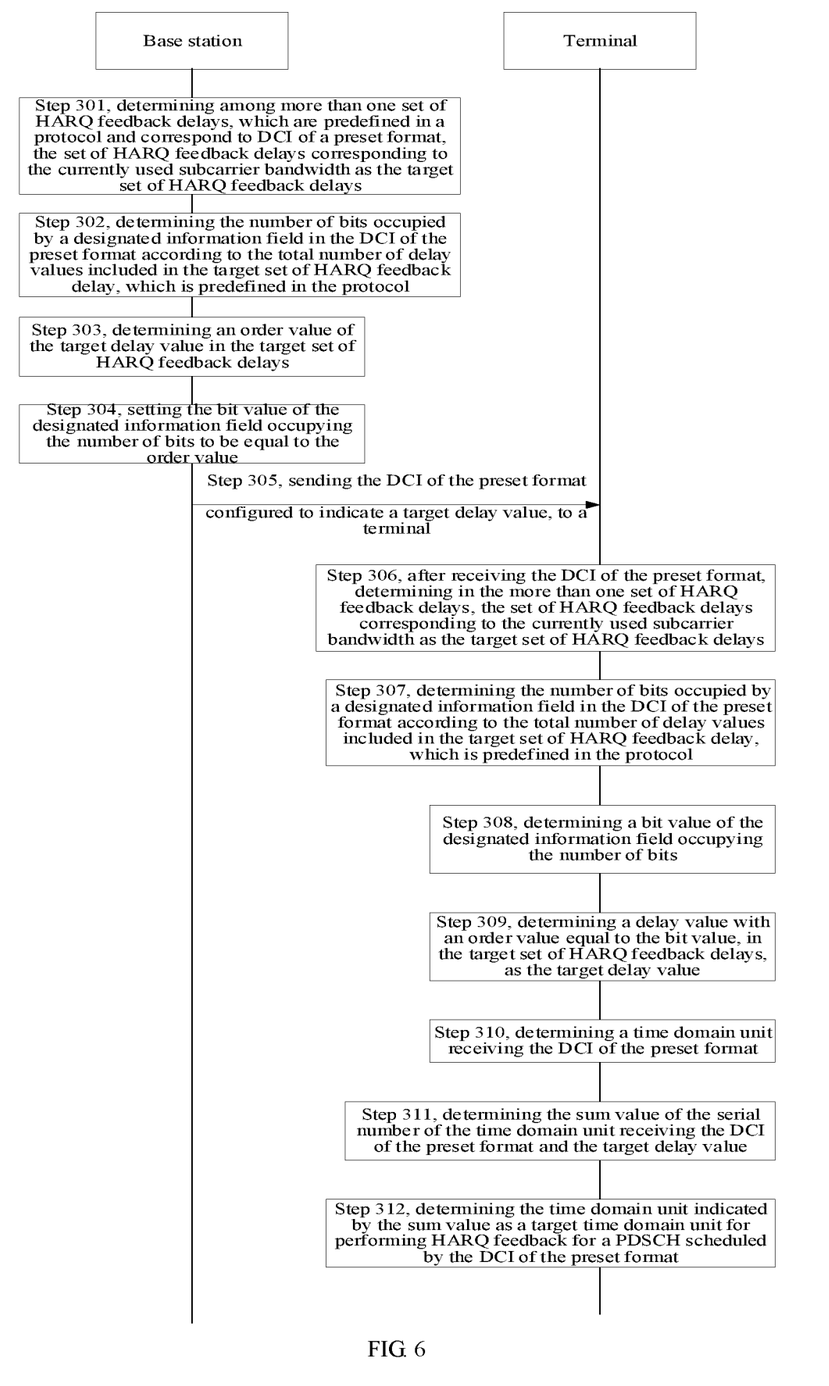
FIG. 6 is a schematic flowchart of another method for determining HARQ feedback delay shown according to an embodiment.

In an optional embodiment, referring to FIG. 6, which is a flow chart of another method for determining HARQ feedback delay shown according to an embodiment, the method may include the following steps:

In step 301, a base station may, among more than one set of HARQ feedback delays, which are predefined in a protocol and correspond to DCI of a preset format, the set of HARQ feedback delays corresponding to the currently used subcarrier bandwidth may be used as the target set of HARQ feedback delays.

In an embodiment of the present disclosure, the more than one set of HARQ feedback delays may correspond to different subcarrier bandwidths, and the larger the subcarrier bandwidth is, the greater the maximum delay value in the corresponding set of HARQ feedback delays is.

In step 302, the base station may determine the number of bits occupied by a designated information field in the DCI of the preset format according to the total number of delay values included in the target set of HARQ feedback delay, which is predefined in the protocol.

Here, the designated information field is an information field in the DCI, which is configured to indicate the target delay value, and the target delay value is one of more than one delay value included in the target set of HARQ feedback delays.

In step 303, the base station may determine an order value of the target delay value in the target set of HARQ feedback delays.

In step 304, the base station may set the bit value of the designated information field occupying the number of bits to be equal to the order value.

In step 305, the base station may send the DCI of the preset format configured to indicate a target delay value, to a terminal.

In step 306, the terminal may, after receiving the DCI of the preset format, in the more than one set of HARQ feedback delays, use the set of HARQ feedback delays corresponding to the currently used subcarrier bandwidth as the target set of HARQ feedback delays.

In step 307, the terminal may determine the number of bits occupied by a designated information field in the DCI of the preset format according to the total number of delay values included in the target set of HARQ feedback delay, which is predefined in the protocol.

In step 308, the terminal may determine a bit value of the designated information field occupying the number of bits.

In step 309, the terminal may determine a delay value with an order value equal to the bit value, in the target set of HARQ feedback delays, as the target delay value.

In step 310, the terminal may determine a time domain unit receiving the DCI of the preset format.

In step 311, the terminal may determine the sum value of the serial number of the time domain unit receiving the DCI of the preset format and the target delay value.

In step 312, the terminal may use the time domain unit indicated by the sum value as a target time domain unit for performing HARQ feedback for a PDSCH scheduled by the DCI of the preset format.

In the above described embodiment, in the communication system of high frequency band, it can be ensured that the terminal can complete the demodulation of the PDSCH and the generation of the HARQ feedback result within the delay unit corresponding to the target delay value, which achieves the purpose of determining the HARQ feedback delay in the communication system of high frequency band.

Corresponding to the above described embodiments of the method for realizing the application functions, the present disclosure further provides embodiments of the apparatus for realizing the application functions.

Figure 7:
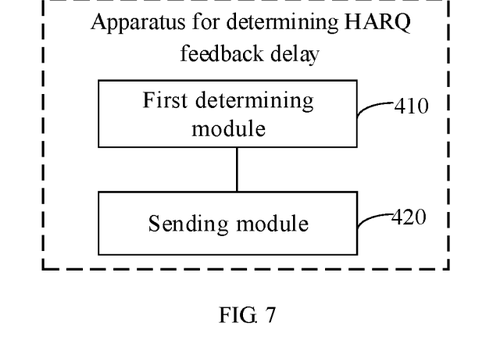
FIG. 7 is a block diagram of an apparatus for determining HARQ feedback delay shown according to an embodiment.

Referring to FIG. 7, which is a block diagram of an apparatus for determining HARQ feedback delay shown according to an embodiment, the apparatus is applied to a base station and includes:

a first determining module 410 configured to determine a target set of HARQ feedback delays among more than one set of HARQ feedback delays, which are predefined in a protocol and correspond to downlink control information DCI of a preset format; wherein the more than one set of HARQ feedback delays correspond to different subcarrier bandwidths;

a sending module 420 configured to send the DCI of the preset format configured to indicate a target delay value, to a terminal; wherein the target delay value is one of more than one delay value included in the target set of HARQ feedback delays.

Figure 8:
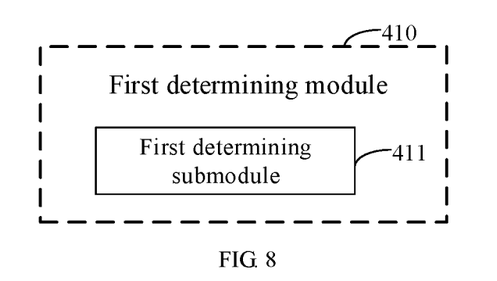
FIG. 8 is a block diagram of another apparatus for determining HARQ feedback delay shown according to an embodiment.

As shown in FIG. 8, FIG. 8 is a block diagram of another apparatus for determining HARQ feedback delay shown according to an embodiment of the present disclosure. This embodiment is based on the foregoing embodiment in FIG. 7, and the first determining module 410 includes:

a first determining submodule 411 configured to use the set of HARQ feedback delays corresponding to the currently used subcarrier bandwidth as the target set of HARQ feedback delays.

Optionally, in the more than one set of HARQ feedback delays, the larger the subcarrier bandwidth is, the greater the maximum delay value in the corresponding set of HARQ feedback delays is.

Figure 9:
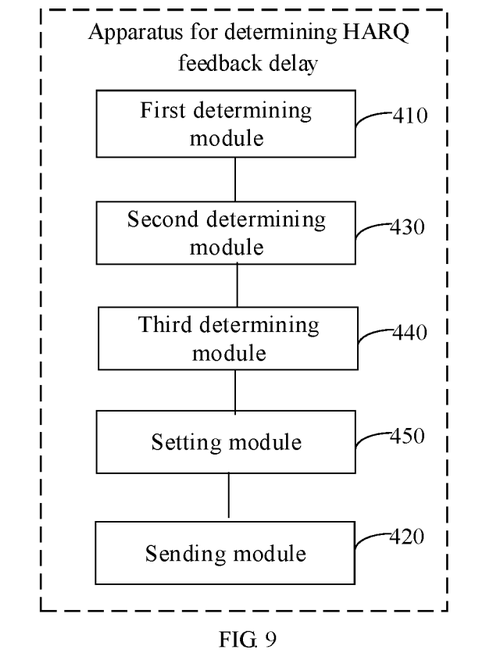
FIG. 9 is a block diagram of another apparatus for determining HARQ feedback delay shown according to an embodiment.

As shown in FIG. 9, FIG. 9 is a block diagram of another apparatus for determining HARQ feedback delay shown according to an embodiment of the present disclosure. This embodiment is based on the foregoing embodiment in FIG. 7, and the apparatus further includes:

a second determining module 430 configured to determine the number of bits occupied by a designated information field in the DCI of the preset format according to the total number of delay values included in the target set of HARQ feedback delay, which is predefined in the protocol; wherein the designated information field is an information field in the DCI, which is configured to indicate the target delay value;

a third determining module 440 configured to determine an order value of the target delay value in the target set of HARQ feedback delays;

a setting module 450 configured to set the bit value of the designated information field occupying the number of bits to be equal to the order value.

Figure 10:
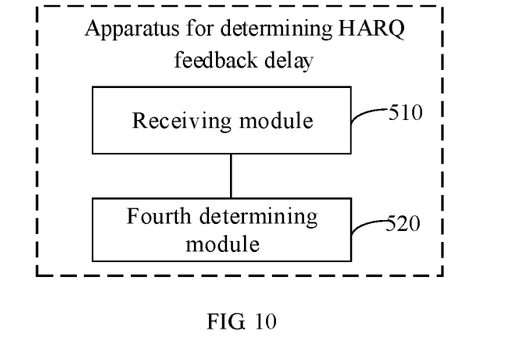
FIG. 10 is a block diagram of another apparatus for determining HARQ feedback delay shown according to an embodiment.

Referring to FIG. 10, which is a block diagram of another apparatus for determining HARQ feedback delay shown according to an embodiment, the apparatus is applied to a terminal and includes:

a receiving module 510 configured to receive downlink control information DCI of a preset format sent by a base station;

a fourth determining module 520 configured to determine a target delay value for performing HARQ feedback according to the DCI of the preset format.

Figure 11:
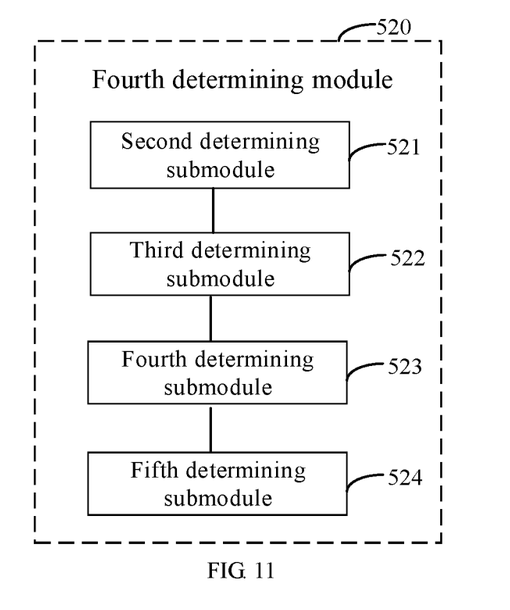
FIG. 11 is a block diagram of another apparatus for determining HARQ feedback delay shown according to an embodiment.

As shown in FIG. 11, FIG. 11 is a block diagram of another apparatus for determining HARQ feedback delay shown according to an embodiment of the present disclosure. This embodiment is based on the foregoing embodiment in FIG. 10, and the fourth determining module 520 includes:

a second determining submodule 521 configured to determine a target set of HARQ feedback delays among more than one set of HARQ feedback delays, which are predefined in a protocol and correspond to downlink control information DCI of a preset format; wherein the more than one set of HARQ feedback delays correspond to different subcarrier bandwidths;

a third determining submodule 522 configured to determine the number of bits occupied by a designated information field in the DCI of the preset format according to the total number of delay values included in the target set of HARQ feedback delay, which is predefined in the protocol; wherein the designated information field is an information field in the DCI, which is configured to indicate the target delay value;

a fourth determining submodule 523 configured to determine a bit value of the designated information field occupying the number of bits;

a fifth determining submodule 524 configured to determine a delay value with an order value equal to the bit value, in the target set of HARQ feedback delays, as the target delay value.

Figure 12:
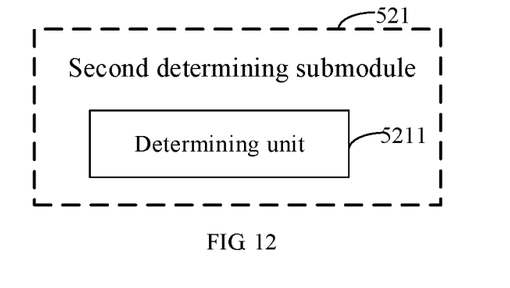
FIG. 12 is a block diagram of another apparatus for determining HARQ feedback delay shown according to an embodiment.

As shown in FIG. 12, FIG. 12 is a block diagram of another apparatus for determining HARQ feedback delay shown according to an embodiment of the present disclosure. This embodiment is based on the foregoing embodiment in FIG. 11, and the second determining submodule 521 includes:

a determining unit 5211 configured to determine the set of HARQ feedback delays corresponding to the currently used subcarrier bandwidth as the target set of HARQ feedback delays.

Optionally, in the more than one set of HARQ feedback delays, the larger the subcarrier bandwidth is, the greater the maximum delay value in the corresponding set of HARQ feedback delays is.

Figure 13:
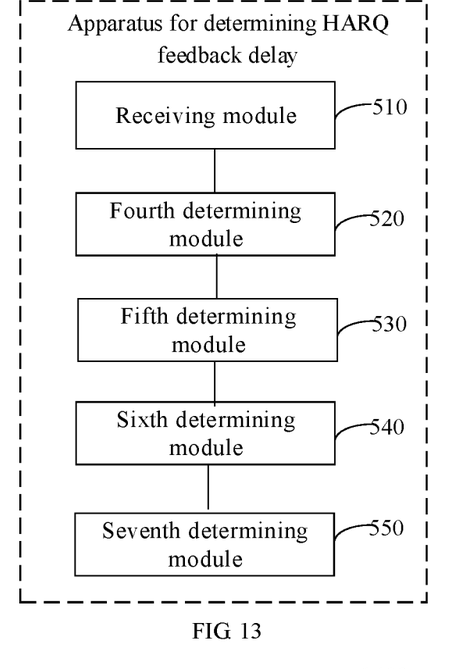
FIG. 13 is a block diagram of another apparatus for determining HARQ feedback delay shown according to an embodiment.

As shown in FIG. 13, FIG. 13 is a block diagram of another apparatus for determining HARQ feedback delay shown according to an embodiment of the present disclosure. This embodiment is based on the foregoing embodiment in FIG. 10, and the apparatus further includes:

a fifth determining module 530 configured to determine a time domain unit receiving the DCI of the preset format;

a sixth determining module 540 configured to determine the sum value of the serial number of the time domain unit receiving the DCI of the preset format and the target delay value;

a seventh determining module 550 configured to determine the time domain unit indicated by the sum value as a target time domain unit for performing HARQ feedback for a physical downlink shared channel PDSCH scheduled by the DCI of the preset format.

As for the apparatus embodiments, because they basically correspond to the method embodiments, for the related parts, please refer to the part of the description of the method embodiments. The apparatus embodiments described above are only illustrative, wherein the above-mentioned units described as separate components may or may not be physically separated, and the components shown as units may or may not be physical units, that is, they may be located in a place, or may also be distributed onto more than one network element. Part or all of the modules can be selected according to actual needs to achieve the purpose of the solutions of the present disclosure. They can be understood and implemented by those skilled in the art without any creative effort.

Correspondingly, the present disclosure further provides a computer-readable storage medium, the storage medium stores a computer program, which is configured to execute any one of the methods for determining HARQ feedback delay for the base station side.

Correspondingly, the present disclosure further provides a computer-readable storage medium, the storage medium stores a computer program, which is configured to execute any one of the methods for determining HARQ feedback delay for the terminal side.

Correspondingly, the present disclosure further provides an apparatus for determining HARQ feedback delay, which is applied to a base station and includes:

a processor;

a memory for storing processor-executable instructions;

wherein the processor is configured to:

determine a target set of HARQ feedback delays among more than one set of HARQ feedback delays, which are predefined in a protocol and correspond to downlink control information DCI of a preset format; wherein the more than one set of HARQ feedback delays correspond to different subcarrier bandwidths;

send the DCI of the preset format configured to indicate a target delay value, to a terminal; wherein the target delay value is one of more than one delay value included in the target set of HARQ feedback delays.

Figure 14:
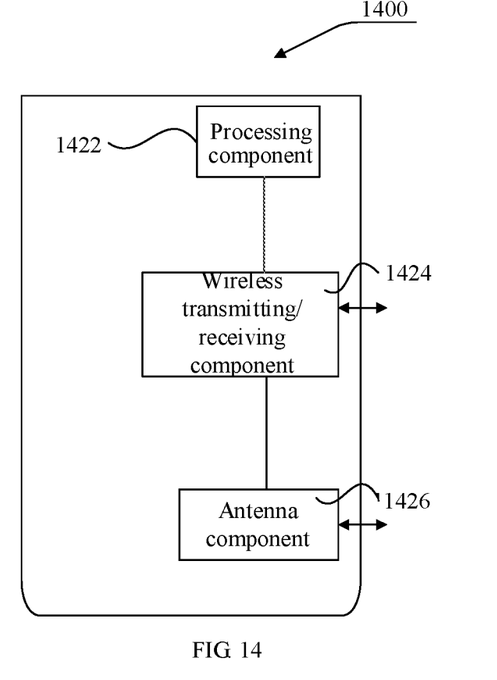
FIG. 14 is a schematic structural diagram of an apparatus for determining HARQ feedback delay shown according to an embodiment of the present disclosure.

As shown in FIG. 14, FIG. 14 is a schematic structural diagram of an apparatus 1400 for determining Hybrid Automatic Repeat reQuest (HARQ) feedback delay shown according to an embodiment. The apparatus 1400 may be provided as a base station. Referring to FIG. 14, the apparatus 1400 includes a processing component 1422, a wireless transmitting/receiving component 1424, an antenna component 1426, and a signal processing part specific to the wireless interface, and the processing component 1422 may further include one or more processors.

One of the processors in the processing component 1422 may be configured to execute any one of the above methods for determining HARQ feedback delay on the base station side.

Correspondingly, the present disclosure further provides an apparatus for determining HARQ feedback delay, which is applied to a terminal and includes:

a processor;

a memory for storing processor-executable instructions;

wherein the processor is configured to:

receive downlink control information DCI of a preset format sent by a base station;

determine a target delay value for performing HARQ feedback according to the DCI of the preset format.

Figure 15:
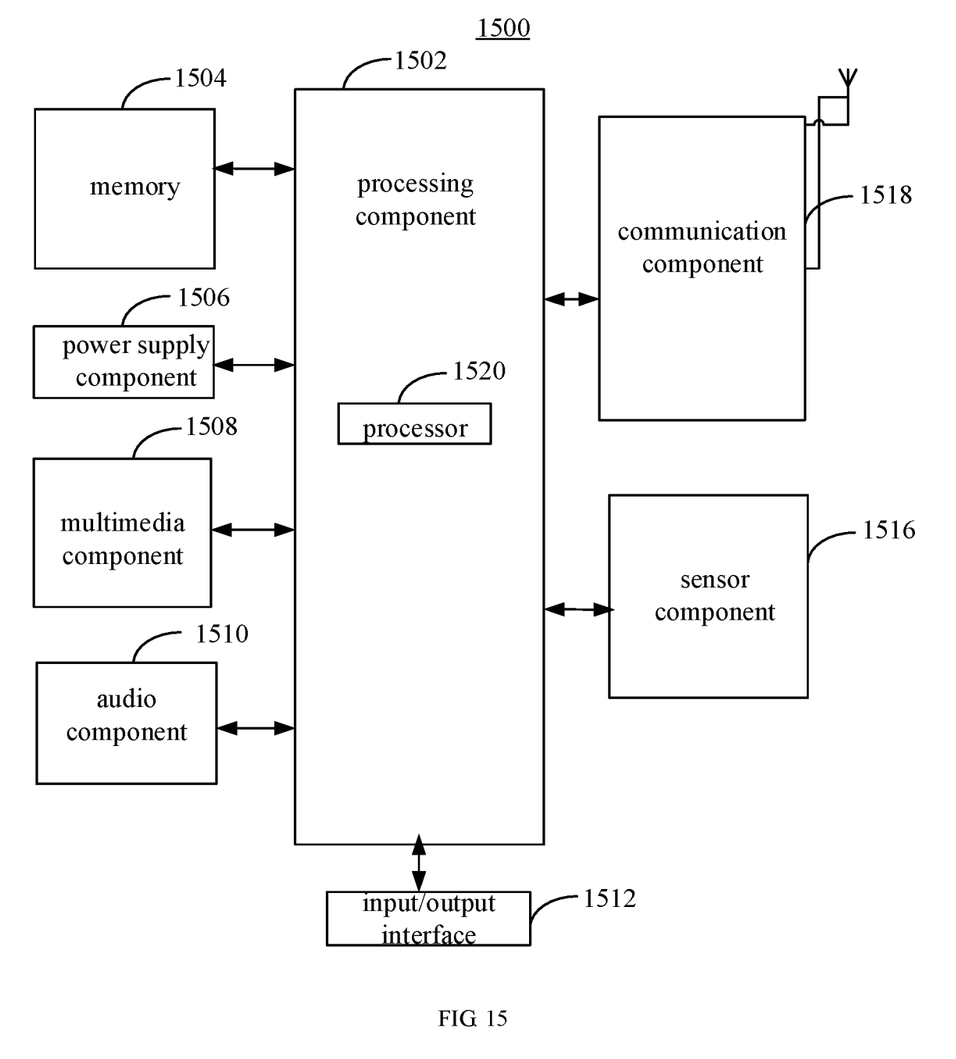
FIG. 15 is a schematic structural diagram of another apparatus for determining HARQ feedback delay shown according to an embodiment of the present disclosure.

FIG. 15 is a block diagram of an electronic device 1500 shown according to an embodiment. For example, the electronic device 1500 may be a terminal such as a mobile phone, a tablet computer, an e-book reader, a multimedia playback device, a wearable device, a vehicle terminal, an ipad, a smart TV, and the like.

Referring to FIG. 15, the electronic device 1500 may include one or more of the following components: a processing component 1502, a memory 1504, a power supply component 1506, a multimedia component 1508, an audio component 1510, an input/output (I/O) interface 1512, a sensor component 1516, and a communication component 1518.

The processing component 1502 generally controls the overall operations of the electronic device 1500, such as operations associated with displaying, phone calling, data communications, camera operations, and recording operations. The processing component 1502 may include one or more processors 1520 to execute instructions to complete all or part of the steps of the above described method for determining Hybrid Automatic Repeat request HARQ feedback delay. Additionally, the processing component 1502 may include one or more modules that facilitate interaction between the processing component 1502 and other components. For example, the processing component 1502 may include a multimedia module to facilitate interaction between the multimedia component 1508 and the processing component 1502. For another example, the processing component 1502 may read executable instructions from the memory, so as to implement the steps of a method for determining HARQ feedback delay provided by the foregoing respective embodiments.

The memory 1504 is configured to store various types of data to support operations at the electronic device 1500. Examples of such data include instructions for any application or method operating on the electronic device 1500, contact data, phonebook data, messages, pictures, videos, and the like. The memory 1504 may be implemented by any type of volatile or non-volatile storage devices or their combination, such as static random access memory (SRAM), electrically erasable programmable read-only memory (EEPROM), erasable Programmable Read Only Memory (EPROM), Programmable Read Only Memory (PROM), Read Only Memory (ROM), magnetic memory, flash memory, magnetic disk or optical disk.

The power supply component 1506 provides power to various components of the electronic device 1500. The power supply components 1506 may include a power supply management system, one or more power supplies, and other components associated with generation, management, and distribution power for the electronic device 1500.

The multimedia component 1508 includes a displaying screen providing an output interface between the electronic device 1500 and the user. In some embodiments, the multimedia component 1508 includes a front camera and/or a rear camera. When the electronic device 1500 is in an operation mode, such as a shooting mode or a video mode, the front camera and/or the rear camera can receive external multimedia data. Each of the front camera and the rear camera may be a fixed optical lens system or have focal length and optical zoom capability.

The audio component 1510 is configured to output and/or input audio signals. For example, the audio component 1510 includes a microphone (MIC), which is configured to receive external audio signals when the electronic device 1500 is in an operation mode, such as a calling mode, a recording mode and a voice recognition mode. Received audio signals may be further stored in the memory 1504 or sent via the communication component 1518. In some embodiments, the audio c 1510 also includes a speaker for outputting audio signals.

The I/O interface 1512 provides an interface between the processing component 1502 and a peripheral interface module, which may be a keyboard, a click wheel, a button, and the like. These buttons may include, but are not limited to: a home button, a volume button, a start button, and a lock button.

The sensor component 1516 includes one or more sensors for providing various aspects of status assessments for the electronic device 1500. For example, the sensor component 1516 can detect the on/off state of the electronic device 1500, the relative positioning of the components, for example, the components are the display and the keypad of the electronic device 1500, the sensor component 1516 can also detect changes in position of the electronic device 1500 or one of the components of the electronic devices 1500, presence or absence of contact of the user with the electronic device 1500, orientation or acceleration/deceleration of the electronic device 1500 and temperature changes of the electronic device 1500. The sensor component 1516 may include a proximity sensor configured to detect the presence of nearby objects in the absence of any physical contact. The sensor component 1516 may further include optical sensors, such as CMOS or CCD image sensors, for use in imaging applications. In some embodiments, the sensor component 1516 may further include an acceleration sensor, a gyroscope sensor, a magnetic sensor, a pressure sensor or a temperature sensor.

The communication component 1518 is configured to facilitate wired or wireless communication between the electronic device 1500 and other devices. The electronic device 1500 can access a wireless network based on communication standards, such as Wi-Fi, 2G, 3G, 4G, or 5G, or a combination thereof. In an embodiment, the communication component 1518 receives broadcast signals or broadcast related information from an external broadcast management system via a broadcast channel. In an embodiment, the communication component 1518 further includes a near field communication (NFC) module to facilitate short-range communication. For example, the NFC module may be implemented based on Radio Frequency Identification (RFID) technology, Infrared Data Association (IrDA) technology, Ultra Wideband (UWB) technology, Bluetooth (BT) technology and other technologies.

In an embodiment, the electronic device 1500 may be implemented by one or more application specific integrated circuits (ASICs), digital signal processors (DSPs), digital signal processing devices (DSPDs), programmable logic devices (PLDs), field programmable gate array (FPGA), controllers, microcontrollers, microprocessors or other electronic elements, and configured to execute the above described method for determining Hybrid Automatic Repeat reQuest HARQ feedback delay.

In an embodiment, a non-transitory machine-readable storage medium including instructions is further provided, such as the memory 1504 including instructions, and the above instructions can be executed by the processor 1520 of the electronic device 1500 to complete the above described wireless charging method. For example, the non-transitory computer readable storage medium may be a ROM, a random access memory (RAM), a CD-ROM, a magnetic tape, a floppy disk, an optical data storage device, and the like.

The technical solutions provided by the embodiments of the present disclosure may include the following beneficial effects.

In an embodiment of the present disclosure, a base station may select one from more than one sets of HARQ feedback delays, which are predefined in a protocol and correspond to the DCI of a preset format, as a target set of HARQ feedback delays. The more than one sets of HARQ feedback delays correspond to different subcarrier bandwidths. Further, the base station sends the DCI of the preset format configured to indicate a target delay value to a terminal, so that the terminal can determine the target delay value. The present disclosure achieves the purpose of determining the HARQ feedback delay in a communication system of high frequency band.

In an embodiment of the present disclosure, the set of HARQ feedback delays corresponding to the currently used subcarrier bandwidth may be determined as the target set of HARQ feedback delays. In an embodiment, in the more than one sets of HARQ feedback delays predefined in the protocol, the larger the subcarrier bandwidth is, the greater the maximum delay value in the corresponding set of HARQ feedback delays is. The present disclosure can ensure that the terminal can complete demodulation of the PDSCH and generation the HARQ feedback result within the time unit corresponding to the target delay value in the communication system of high frequency band, which achieves the purpose of determining the HARQ feedback delay in a communication system of high frequency band.

In an embodiment of the present disclosure, the number of bits occupied by the designated information field in the DCI of the preset format may be determined according to the total number of delay values included in the target set of HARQ feedback delays, which is predefined in the protocol. Here, the designated information field is an information field in the DCI, which is configured to indicate the target delay value. Further, according to the target delay value, the bit value of the designated information field occupying the number of bits may be determined. Therefore, the purpose of sending the target delay value to the terminal through the designated information field of the DCI of the preset format in the communication system of high frequency band is achieved.

In the embodiment of the present disclosure, a terminal in a communication system of high frequency band may receive downlink control information DCI of a preset format sent by a base station, so that a target delay value for performing HARQ feedback may be determined according to the DCI of the preset format. And the purpose of determining the HARQ feedback delay in a communication system of high frequency band is achieved.

Other embodiments of the disclosure will readily occur to those skilled in the art after consideration of the specification and practice of the disclosure disclosed herein. The present disclosure is intended to cover any modification, use or adaptive change of the present disclosure, and these modifications, uses or adaptive changes follow the general principles of the present disclosure and include common knowledge or commonly used technical means in the technical field, which are not disclosed in the present disclosure. The specification and the embodiments are to be considered exemplary only, with the true scope and the spirit of the present disclosure being indicated by the following claims.

It should be understood that the present disclosure is not limited to the precise constructions which have been described above and shown in the accompanying drawings, and various modifications and changes may be made without departing from the scope thereof.

In an embodiment, a method for determining HARQ feedback delay, performed by a base station, includes:
  determining a target set of HARQ feedback delays among more than one sets of HARQ feedback delays, which are predefined in a protocol and correspond to downlink control information (DCI) of a preset format; wherein the more than one sets of HARQ feedback delays correspond to different subcarrier bandwidths;
  sending the DCI of the preset format configured to indicate a target delay value, to a terminal, wherein the target delay value is one of more than one delay values included in the target set of HARQ feedback delays.

In an embodiment, determining the target set of HARQ feedback delays includes:
  determining a set of HARQ feedback delays corresponding to a currently used subcarrier bandwidth as the target set of HARQ feedback delays.

In an embodiment, in the more than one sets of HARQ feedback delays, the larger the subcarrier bandwidth is, the greater a maximum delay value in the corresponding set of HARQ feedback delays is.

In an embodiment, the method further includes:
  determining a number of bits occupied by a designated information field in the DCI of the preset format according to a total number of delay values included in the target set of HARQ feedback delays, which is predefined in the protocol; wherein the designated information field is an information field in the DCI, which is configured to indicate the target delay value;
  determining an order value of the target delay value in the target set of HARQ feedback delays;
  setting a bit value of the designated information field occupying the number of bits to be equal to the order value.

In an embodiment, another method for determining HARQ feedback delay, performed by a terminal, includes:
  receiving downlink control information (DCI) of a preset format sent by a base station;
  determining a target delay value for performing HARQ feedback according to the DCI of the preset format.

In an embodiment, determining the target delay value for performing HARQ feedback according to the DCI of the preset format includes:
  determining a target set of HARQ feedback delays among more than one sets of HARQ feedback delays, which are predefined in a protocol and correspond to downlink control information (DCI) of a preset format; wherein the more than one sets of HARQ feedback delays correspond to different subcarrier bandwidths;
  determining a number of bits occupied by a designated information field in the DCI of the preset format according to a total number of delay values included in the target set of HARQ feedback delays, which is predefined in the protocol; wherein the designated information field is an information field in the DCI, which is configured to indicate the target delay value;
  determining a bit value of the designated information field occupying the number of bits;
  determining a delay value with an order value equal to the bit value, in the target set of HARQ feedback delays, as the target delay value.

In an embodiment, determining the target set of HARQ feedback delays includes:
  determining the set of HARQ feedback delays corresponding to a currently used subcarrier bandwidth as the target set of HARQ feedback delays.

In an embodiment, in the more than one sets of HARQ feedback delays, the larger the subcarrier bandwidth is, the greater a maximum delay value in the corresponding set of HARQ feedback delays is.

In an embodiment, after determining the target delay value for performing HARQ feedback, the method further includes:
  determining a time domain unit receiving the DCI of the preset format; determining a sum value of a serial number of the time domain unit receiving the DCI of the preset format and the target delay value;
  determining the time domain unit indicated by the sum value as a target time domain unit for performing HARQ feedback for a physical downlink shared channel (PDSCH) scheduled by the DCI of the preset format.

In an embodiment, an apparatus for determining HARQ feedback delay, applied in a base station, includes:
  a first determining module configured to determine a target set of HARQ feedback delays among more than one sets of HARQ feedback delays, which are predefined in a protocol and correspond to downlink control information (DCI) of a preset format; wherein the more than one sets of HARQ feedback delays correspond to different subcarrier bandwidths;
  a sending module configured to send the DCI of the preset format configured to indicate a target delay value, to a terminal; wherein the target delay value is one of more than one delay values included in the target set of HARQ feedback delays.

In an embodiment, the first determining module includes:
  a first determining submodule configured to determine the set of HARQ feedback delays corresponding to a currently used subcarrier bandwidth, as the target set of HARQ feedback delays.

In an embodiment, in the more than one sets of HARQ feedback delays, the larger the subcarrier bandwidth is, the greater a maximum delay value in the corresponding set of HARQ feedback delays is.

In an embodiment, the apparatus further includes:
a second determining module configured to determine a number of bits occupied by a designated information field in the DCI of the preset format according to a total number of delay values included in the target set of HARQ feedback delays, which is predefined in the protocol; wherein the designated information field is an information field in the DCI, which is configured to indicate the target delay value;
a third determining module configured to determine an order value of the target delay value in the target set of HARQ feedback delays;
a setting module configured to set a bit value of the designated information field occupying the number of bits to be equal to the order value.

In an embodiment, another apparatus for determining HARQ feedback delay, applied in a terminal, includes:
a receiving module configured to receive downlink control information (DCI) of a preset format sent by a base station;
a fourth determining module configured to determine a target delay value for performing HARQ feedback according to the DCI of the preset format.

In an embodiment, the fourth determining module includes:
a second determining submodule configured to determine a target set of HARQ feedback delays among more than one sets of HARQ feedback delays, which are predefined in a protocol and correspond to downlink control information (DCI) of a preset format; wherein the more than one sets of HARQ feedback delays correspond to different subcarrier bandwidths;
a third determining submodule configured to determine a number of bits occupied by a designated information field in the DCI of the preset format according to a total number of delay values included in the target set of HARQ feedback delays, which is predefined in the protocol; wherein the designated information field is an information field in the DCI, which is configured to indicate the target delay value;
a fourth determining submodule configured to determine a bit value of the designated information field occupying the number of bits;
a fifth determining submodule configured to determine a delay value with an order value equal to the bit value, in the target set of HARQ feedback delays, as the target delay value.

In an embodiment, the second determining submodule includes:
a determining unit configured to determine the set of HARQ feedback delays corresponding to a currently used subcarrier bandwidth as the target set of HARQ feedback delays.

In an embodiment, in the more than one sets of HARQ feedback delays, the larger the subcarrier bandwidth is, the greater a maximum delay value in the corresponding set of HARQ feedback delays is.

In an embodiment, the apparatus further includes:
a fifth determining module configured to determine a time domain unit receiving the DCI of the preset format;
a sixth determining module configured to determine a sum value of a serial number of the time domain unit receiving the DCI of the preset format and the target delay value;
a seventh determining module configured to determine a time domain unit indicated by the sum value as a target time domain unit for performing HARQ feedback for a physical downlink shared channel (PDSCH) scheduled by the DCI of the preset format.

In an embodiment, a computer-readable storage medium is provided. The storage medium stores a computer program, which is configured to perform the method for determining HARQ feedback delay according to any one of the above embodiments.

In an embodiment, a computer-readable storage medium is provided. The storage medium stores a computer program, which is configured to perform the other method for determining HARQ feedback delay according to any one of the above embodiments.

In an embodiment, an apparatus for determining HARQ feedback delay is provided. The apparatus is applied to a base station and includes:
a processor;
a memory for storing processor-executable instructions;
wherein the processor is configured to:
determine a target set of HARQ feedback delays among more than one sets of HARQ feedback delays, which are predefined in a protocol and correspond to downlink control information (DCI) of a preset format; wherein the more than one sets of HARQ feedback delays correspond to different subcarrier bandwidths;
send the DCI of the preset format configured to indicate a target delay value, to a terminal; wherein the target delay value is one of more than one delay values included in the target set of HARQ feedback delays.

In an embodiment, an apparatus for determining HARQ feedback delay is provided. The apparatus is applied to a terminal and includes:
a processor;
a memory for storing processor-executable instructions;
wherein the processor is configured to:
receive downlink control information DCI of a preset format sent by a base station;
determine a target delay value for performing HARQ feedback according to the DCI of the preset format.

What is claimed is:

1. A method for determining hybrid automatic repeat request (HARQ) feedback delay, performed by a base station, comprising:
determining a target set of HARQ feedback delays among more than one set of HARQ feedback delays, which are predefined in a protocol and correspond to downlink control information (DCI) of a preset format; wherein the more than one set of HARQ feedback delays correspond to different subcarrier spacings (SCSs); and
sending the DCI of the preset format configured to indicate a value of count of time units corresponding to a HARQ feedback delay, to a terminal, wherein the HARQ feedback delay is one of more than one value included in the target set of HARQ feedback delays;
wherein, in the more than one set of HARQ feedback delays, the larger a SCS is, the greater a maximum value in the corresponding set of HARQ feedback delays is.

2. The method of claim 1, wherein, determining the target set of HARQ feedback delays comprises:
determining a set of HARQ feedback delays corresponding to a currently used SCS as the target set of HARQ feedback delays.

3. The method of claim 1, further comprising:
determining count of bits occupied by a designated information field in the DCI of the preset format according to a total number of values included in the target set of HARQ feedback delays, which is predefined in the protocol; wherein the designated information field is an information field in the DCI, which is configured to indicate the value of the count of time units corresponding to the HARQ feedback delay;
determining an order value of the value of the count of time units corresponding to the HARQ feedback delay in the target set of HARQ feedback delays; and
setting a bit value of the designated information field occupying the count of bits to be equal to the order value.

4. A method for determining hybrid automatic repeat request (HARQ) feedback delay, performed by a terminal, comprising:
receiving downlink control information (DCI) of a preset format sent by a base station;
determining a value of count of time units corresponding to a HARQ feedback delay for performing HARQ feedback according to the DCI of the preset format;
wherein, in more than one set of HARQ feedback delays, which are predefined in a protocol and correspond to the DCI of the preset format, the larger a subcarrier spacing (SCS) is, the greater a maximum value in the corresponding set of HARQ feedback delays is.

5. The method of claim 4, wherein determining the value of the count of time units corresponding to the HARQ feedback delay for performing HARQ feedback according to the DCI of the preset format comprises:
determining a target set of HARQ feedback delays among the more than one set of HARQ feedback delays; wherein the more than one set of HARQ feedback delays correspond to different SCSs;
determining count of bits occupied by a designated information field in the DCI of the preset format according to a total number of values included in the target set of HARQ feedback delays, which is predefined in the protocol; wherein the designated information field is an information field in the DCI, which is configured to indicate the value of the count of time units corresponding to the HARQ feedback delay;
determining a bit value of the designated information field occupying the count of bits; and
determining a value with an order value equal to the bit value, in the target set of HARQ feedback delays, as the value of the count of time units corresponding to the HARQ feedback delay.

6. The method of claim 5, wherein determining the target set of HARQ feedback delays comprises:
determining the set of HARQ feedback delays corresponding to a currently used SCS as the target set of HARQ feedback delays.

7. The method of claim 4, wherein, after determining the value of the count of time units corresponding to the HARQ feedback delay for performing HARQ feedback, the method further comprises:
determining a time domain unit receiving the DCI of the preset format;
determining a sum value of a serial number of the time domain unit receiving the DCI of the preset format and the value of the count of time units corresponding to the HARQ feedback delay; and
determining a time domain unit indicated by the sum value as a target time domain unit for performing HARQ feedback for a physical downlink shared channel (PDSCH) scheduled by the DCI of the preset format.

8. A base station, comprising:
a processor; and
a memory for storing processor-executable instructions;
wherein the processor is configured to perform the method of claim 1.

9. A terminal, comprising:
a processor; and
a memory for storing processor-executable instructions;
wherein the processor is configured to:
receive downlink control information (DCI) of a preset format sent by a base station;
determine a value of count of time units corresponding to a hybrid automatic repeat request (HARQ) feedback delay for performing HARQ feedback according to the DCI of the preset format;
wherein, in more than one set of HARQ feedback delays, which are predefined in a protocol and correspond to the DCI of the preset format, the larger a subcarrier spacing (SCS) is, the greater a maximum value in the corresponding set of HARQ feedback delays is.

10. The terminal of claim 9, wherein the processor is further configured to:
determine a target set of HARQ feedback delays among the more than one set of HARQ feedback delays; wherein the more than one set of HARQ feedback delays correspond to different SCSs;
determine count of bits occupied by a designated information field in the DCI of the preset format according to a total number of values included in the target set of HARQ feedback delays, which is predefined in the protocol; wherein the designated information field is an information field in the DCI, which is configured to indicate the value of the count of time units corresponding to the HARQ feedback delay;
determine a bit value of the designated information field occupying the count of bits; and
determine a value with an order value equal to the bit value, in the target set of HARQ feedback delays, as the value of the count of time units corresponding to the HARQ feedback delay.

11. The terminal of claim 10, wherein the processor is further configured to:
determine the set of HARQ feedback delays corresponding to a currently used SCS as the target set of HARQ feedback delays.

12. The terminal of claim 9, wherein after determining the value of the count of time units corresponding to the HARQ feedback delay for performing HARQ feedback, the processor is further configured to:
determine a time domain unit receiving the DCI of the preset format;
determine a sum value of a serial number of the time domain unit receiving the DCI of the preset format and the value of the count of time units corresponding to the HARQ feedback delay; and
determine a time domain unit indicated by the sum value as a target time domain unit for performing HARQ feedback for a physical downlink shared channel (PDSCH) scheduled by the DCI of the preset format.

* * * * *